United States Patent
Robert

(10) Patent No.: US 8,364,011 B2
(45) Date of Patent: Jan. 29, 2013

(54) SYSTEM AND METHOD FOR PROVIDING A PERSONALIZED MEDIA CONSUMPTION EXPERIENCE

(75) Inventor: Arnaud Robert, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 681 days.

(21) Appl. No.: 12/387,751

(22) Filed: May 6, 2009

(65) Prior Publication Data

US 2010/0293581 A1    Nov. 18, 2010

(51) Int. Cl.
*H04N 9/80* (2006.01)
(52) U.S. Cl. .................... 386/239; 386/240; 386/241
(58) Field of Classification Search .............. 386/331, 386/335
See application file for complete search history.

(56) References Cited

U.S. PATENT DOCUMENTS

| 8,023,799 B2 * | 9/2011 | Shinkai et al. ............... 386/281 |
| 2007/0300261 A1 * | 12/2007 | Barton et al. .................. 725/58 |

OTHER PUBLICATIONS

*Advanced Access Content System (AACS), CBHD Pre-recorded Book* (Oct. 7, 2008).

* cited by examiner

Primary Examiner — Jamie Atala
(74) Attorney, Agent, or Firm — Farjami & Farjami LLP

(57) ABSTRACT

There are presented systems and methods for enabling an association of media information relating to a playback of a media content file with a medium containing the media content file. In one embodiment, such a method for use by a playback device comprises obtaining a unique identifier present on the medium, transmitting the unique identifier, obtaining the media information relating to a usage of the media content file, and transmitting the media information. In another embodiment, such a method for use by a server comprises receiving a unique identifier present on the medium, storing the unique identifier in a memory, receiving the media information of the media content file according to the playing of the media content file, storing the media information in the memory, and associating the media information with the unique identifier.

28 Claims, 5 Drawing Sheets

SYSTEM AND METHOD FOR PROVIDING A PERSONALIZED MEDIA CONSUMPTION EXPERIENCE

BACKGROUND OF THE INVENTION

1. Field of the Invention

The present invention relates generally to the presentation of media content. More particularly, the present invention relates to systems and methods providing data driven management of media content presentation.

2. Background Art

One of the great advantages made available to the average consumer by recent advances in entertainment technology is the exceptional level of personal control the consumer can now exert over the experience of viewing or otherwise consuming entertainment content. Consider for a moment the experience of viewing a major motion picture commercially distributed on a medium such as a standard definition digital video disc (DVD) or high definition Blu-ray disc, for example. Typically, in addition to the core movie content distributed on the media disc, that disc will also include selectable playback settings enabling a consumer to customize the viewing experience to their own personal preferences. In addition, the media disc will likely include bonus content, distributed with the core movie content, such as trailers promoting other movies, or advertising content, for example.

As a result of the selectable playback settings and bonus content distributed on the media disc, the user of the disc now has considerable latitude in shaping their consumption experience. For example, depending on the display format of the presentation system on which a movie will be viewed, e.g., widescreen or letterbox, the consumer may specify their preferred viewing format, or simply allow the media disc to play back using its default settings. Similarly, although the core movie content is distributed in a default language, typically English in the United States, other language options are frequently available, so that a native speaker of another language has the option of viewing the movie with the dialogue presented in Spanish, or French, for example.

The consumer may further expand or enhance their consumption experience by choosing to view one or more elements of the bonus content provided on the media disc, but not played back as part of the default presentation process. Consequently, by taking specific actions to make changes to the playback settings away from the default parameters that would determine presentation absent such affirmative intervention, the consumer can modify the viewing experience, the audio experience, playback length, and even the composition of the content being consumed, according to their own tastes and preferences. In addition, the position of last playback of the content may be saved by the playback device, at least temporarily, allowing the consumer to stop playback of the media disc altogether, and resume playback at a later time, or later date at the point in the movie where they stopped playback.

Despite the many advantages attributed above to existing approaches to enabling consumer control over the consumption of packaged media content, there remain some significant deficiencies. For example, because of the limited memory storage present on most playback devices, the personalized playback settings selected by a consumer may be retained for only a short time or completely lost, requiring that the consumer to set once again their preferences at the next viewing of the media. This may occur because the memory storage can only reserve a limited amount of memory for storage of consumer selected parameters, so that those parameters are overwritten during future playback of another disc, for instance.

Furthermore, whatever personalized settings are saved by the playback device, are typically saved locally on the playback device, and are thus specific to the playback device rather than to the media content itself. As a result, the conventional consumption experience lacks portability in that the consumer cannot begin viewing the media content on a first playback device and have their personalized playback settings preserved if they subsequently choose to complete the viewing experience using a second playback device. The same limitation occurs for playback of different elements of the media, for example the trailers or any bonus material that the consumer may have already watched or consumed.

One conventional attempt to mitigate staleness or content obsolescence utilizes the network connectivity of some playback devices, such as Blu-ray players, for example, to periodically refresh or provide replacement content for the bonus content burned into the media disc, by delivering fresh content over the network. Although providing some benefits, this approach also imposes some inconveniences on the consumer. For example, a consumer is typically required to participate in a network registration process, as well as periodically to actively login to the network to authenticate their identity as registered user. Also, this approach does not include information about the consumer's preferences; all consumers will obtain the more fresh content at a particular point in time, whether the consumer has already seen it or not. Moreover, this approach does nothing to address the lack of portability of the personalized presentation parameters, flowing from their local storage on the playback device, and the related issues around the memory size of the playback devices and the associated shortcomings discussed previously.

Accordingly, there is a need to overcome the drawbacks and deficiencies in the art by presenting a solution enabling the consumer of a media disc to persistently and portably associate personalized presentation parameters with the media content stored on the disc, and to have those personalized presentation parameters applied across more than one playback device. In addition, it is desirable that the solution further provide the consumer with fresh relevant bonus content responsive to their personal preferences, without requiring the consumer to proactively provide a network login or otherwise expressly specify or request delivery of the bonus content.

SUMMARY OF THE INVENTION

There are provided systems and methods for providing a personalized media consumption experience, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
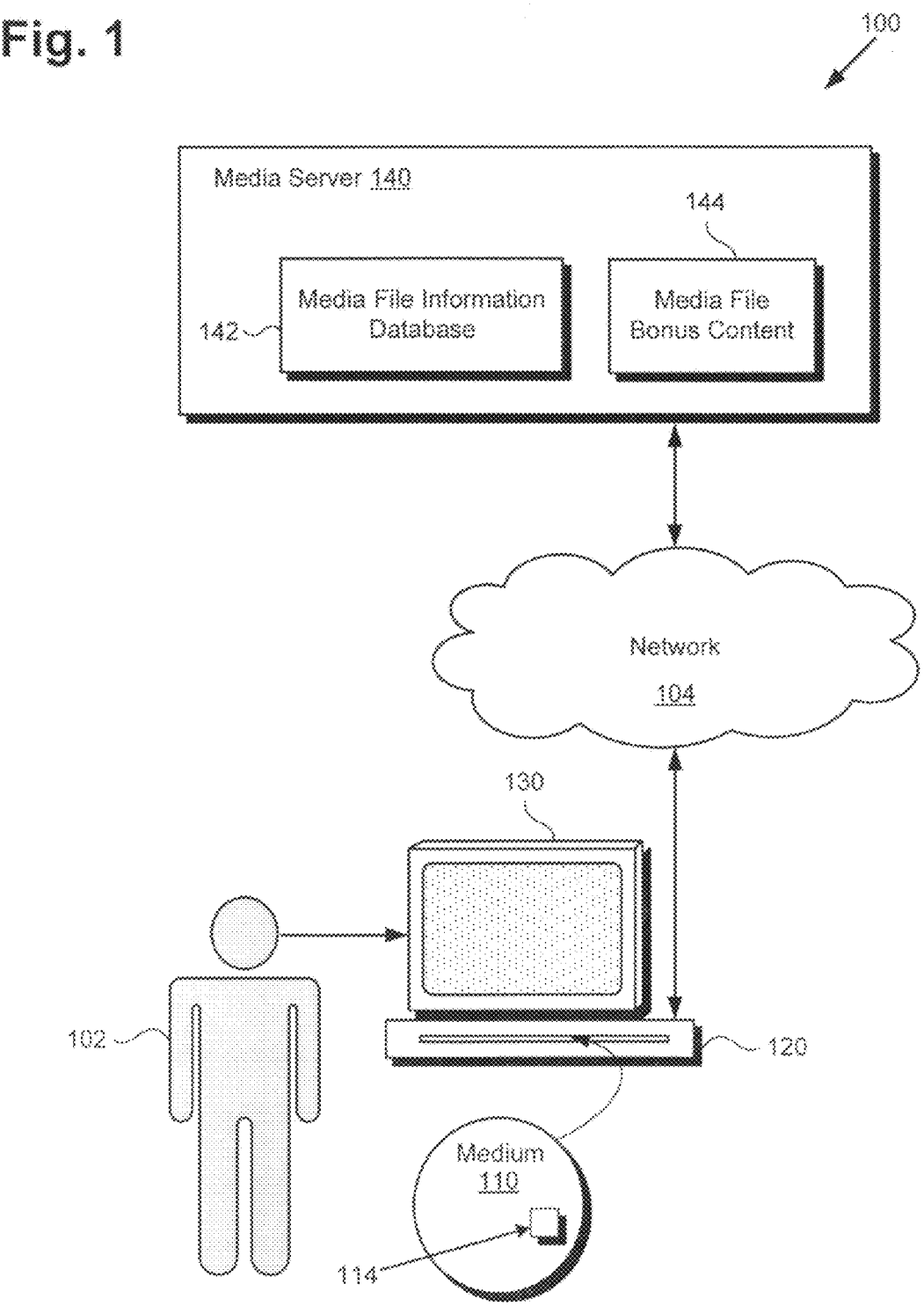
FIG. 1 shows a block diagram of a system for providing a personalized media consumption experience, according to one embodiment of the present invention.

The present application is directed to a system and method for providing a personalized media consumption experience. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

FIG. 1 is a block diagram of system 100 for providing a personalized media consumption experience, according to one embodiment of the present invention. In the embodiment of FIG. 1, system 100 comprises media playback device 120 interactively linked to media rendering system 130 and media server 140. As shown in FIG. 1, media server 140 includes media file information database 142 and media file bonus content 144. Also included in FIG. 1 are consumer 102, content medium 110 including unique identifier 114, and network 104 linking playback device 120 and media server 140.

It is noted that although media playback device 120 is shown as a media disc player coupled to rendering system 130 in FIG. 1, that representation is provided merely as an example. In other embodiments media playback device 120 may comprise another type of mobile or stationary personal communication device or system, and may comprise an integrated media playback and rendering system, such as a laptop computer, mobile telephone, personal digital assistant (PDA), or gaming console, for example.

According to the embodiment of FIG. 1, consumer 102 may utilize playback device 120 to consume media content stored on content medium 110, through its presentation on rendering system 130. Moreover, playback device 120 is configured to associate media information relating to playback of a media content file stored on content medium 110, with either that media content file, or the content medium itself. In system 100, this may be accomplished through use of unique identifier 114 present on content medium 110.

Thus, media information such as playback settings preferred by consumer 102 for playback of the media content file stored on content medium 110, a viewing or playback history of the media file by consumer 102, and a viewing or playback history of bonus elements (e.g. trailers, other media content, games, and so on) accompanying the media content file may be persistently associated with the media content file and/or with content medium 110. Because playback device 120 is in communication with media server 140 through network 104, in one embodiment, the media information associated with unique identifier 114 can be stored in media file information database 142. In such an embodiment, for example, playback device 120 can be configured to access media information database 142 through network 104, and retrieve the media information associated with unique identifier 114, upon insertion of content medium 110 into playback device 120. As a result, media file information database 142 may be utilized to persistently store preferred playback settings and other media information for a large library of content media such as content medium 110.

Furthermore, association of media information such as preferred playback settings with the media content file or content medium 110, rather than playback device 120, and storage of that media information on media server 140, rather than on playback device 120, enables portability of the media information as well. For example, let us assume that content medium 110 is an optical video disc on which is stored a recently released motion picture, accompanied by three trailers for other soon to be released movies.

Consumer 102 may initiate a first time playback of content medium 110 on playback device 120. At that time, consumer 102 may actively override the default playback settings of content medium 110 by selecting a preferred viewing format and language, for example. Consumer 102 may then begin viewing the movie trailers, and liking one devoted to an upcoming action-adventure movie in particular, may play that trailer several times. Consumer 102 may then watch a second trailer for an historical period piece, but elect not to watch the third trailer for a romantic comedy. Having moved passed the movie trailers, consumer 102 then begins playback of the featured movie itself. However, due to other obligations, consumer 102 is unable to enjoy the movie in its entirety in a single viewing session. Consequently, consumer 102 stops playback of content medium 110 and removes content medium 110 from playback device 120.

According to the present invention, media information relating to the playback of content medium 110 has been associated with the media content file representing the feature film and/or content medium 110, through unique identifier 114. That is to say, the preferred playback settings selected by consumer 102 on playback device 120, the repeated viewing of the action-adventure movie trailer, the unrepeated viewing of the historical period piece movie trailer, the non-viewing of the romantic comedy movie trailer, and the stop position during playback of the feature movie media file, are associated with the media content file and/or content medium 110. That media information can then be stored, for example temporarily on playback device 120 due to limits on available memory space, or more persistently on media server 140. An additional significant advantage of media server 140 based storage of the media information, is that subsequent insertion of content medium 110 in a suitably networked playback device other than playback device 120 enables use of the media information associated with content medium 10 to personalize the viewing experience of consumer 102 on that other playback device.

Consequently, when consumer 102 inserts content medium 110 into the other networked playback device at some later date or time, he or she may be presented with new bonus content, such as additional movie trailers, according to the viewing history of consumer 102. Thus, repeated playback of the action adventure movie trailer during the initial playback session may result in its being presented again. In addition, that repeated earlier playback coupled with non-repetition of the historical period piece movie trailer and the non-viewing of the romantic comedy movie trailer may result in substitution of those two former trailers with fresh material directed to alternative action-adventure movies. Furthermore, when playback of the feature movie stored on content medium 110 is resumed, it may automatically resume at the point at which playback stopped during the initial viewing session, and may proceed with the preferred playback settings selected by consumer 102 still in effect. All this despite the playback being resumed on a different playback device than the one where the content was originally viewed. In addition, because it is contemplated that the described media information will be obtained and transmitted in an automated way over network 104, consumer 102 may enjoy the benefits of the present personalized media consumption experience without having to take affirmative steps to provide a network login or registration.

As another example, content medium 110 may be a Blu-ray disc on which is stored one or more games. Specifically, let us assume that content medium 110 comprises a quiz type game. In that case, consumer 102 may initiate play of the quiz game, for example, on playback device 120. Consumer 102 may selectively override the default game settings by choosing preferred gaming parameters, such as a language for the quiz questions, whether the quiz questions are presented as audio or text, and the subject categories from which quiz questions will by drawn, for example. Consumer 102 may then begin answering quiz questions and accumulating a game score, but be unwilling or unable to complete game play in a single session. Consequently, consumer 102 stops playback of content medium 110, e.g., suspends game play, and removes content medium 110 from playback device 120.

According to some embodiments of the present invention, media information relating to the playback of content medium 110 has been associated with content medium 110 through unique identifier 114. That is to say, the preferred game settings selected by consumer 102 on playback device 120, the series of questions consumer 102 has been asked, and the cumulative score achieved by consumer 102 prior to suspension of play are associated with the media content file representing the quiz game, and/or content medium 110. That media information can then be stored, for example temporarily on playback device 120 due to limits on available memory space, or more persistently on media server 140.

Consequently, when consumer 102 inserts content medium 110 into the same or another networked playback device at some later date or time, he or she may automatically resume game play at the point at which playback of content medium 110 stopped during the initial session, and may proceed with the preferred game settings selected by consumer 102, and the prior game status, e.g. score and progress through the game, still in effect. An analogous set of circumstances can be envisioned for play of a dynamically interactive video game, such as a shooting game, for example.

It is contemplated that the expression "media information" is applied to a wide variety of data. Thus, media information may comprise viewing parameters, such as widescreen format, language choice, the presence or absence of subtitles, and the like. Media information may also include gaming parameters, such as screen colors, subject matter, virtual combat or ride vehicles, and virtual weapons, for example. In addition, media information may include progress through a particular media file, such as a stop playback point of a movie, or play suspension point of a game, as well as scores and/or player accomplishments during a previous game session. Moreover, media information may further include an interaction history with bonus elements accompanying the media content file.

Figure 2:
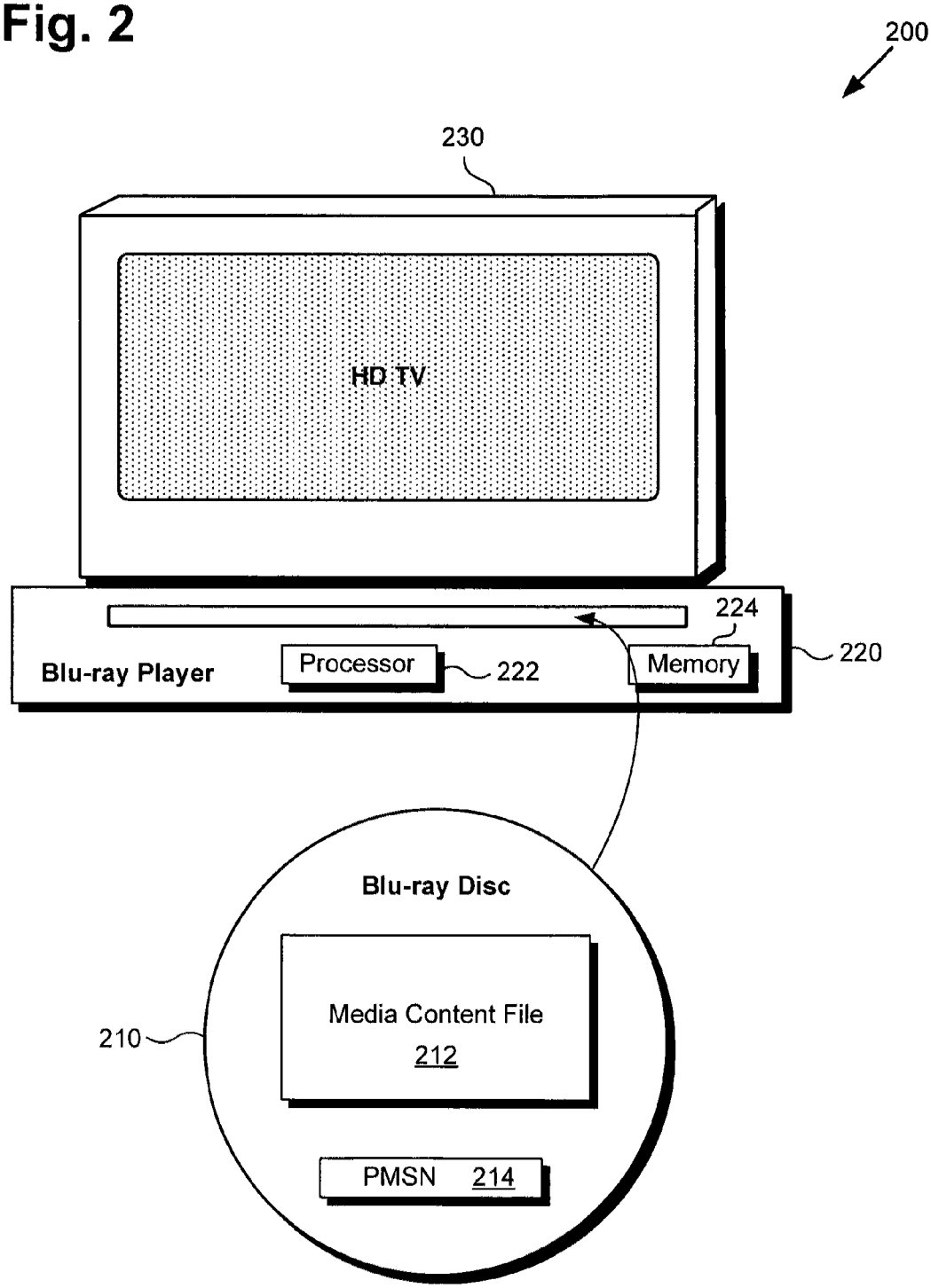
FIG. 2 shows a specific implementation of a playback device configured to provide a personalized media consumption experience, according to one embodiment of the present invention.

Turning now to FIG. 2, FIG. 2 shows a specific implementation of a playback device configured to provide a personalized media consumption experience, according to one embodiment of the present invention. System 200, in FIG. 2, comprises Blu-ray player 220 including processor 222 and memory 224, interactively linked to high definition television (HD TV) 230. Also shown in FIG. 2 is Blu-ray disc 210 including media content file 212 and Pre-Recorded Media Serial Number (PMSN) 214. Blu-ray player 220, HD TV 230, and Blu-ray disc 210 including PMSN 214, in FIG. 2, correspond respectively to media playback device 120, media rendering system 130, and content medium 110 including unique identifier 114, in FIG. 1.

As was true for system 100, Blu-ray player 220 in FIG. 2, is configured to be in communication with a media server corresponding to media server 140, in FIG. 1, via a network such as network 104 in that figure (media server and network not expressly shown in FIG. 2). According to the embodiment of FIG. 2, PMSN 214 may be the unique identifier enabling association of media information relating to playback of media content file 212, with Blu-ray disc 210. As a result, a consumer of Blu-ray disc 210 having first viewed some or all of media content file 212 using Blu-ray player 220, may enjoy his or her preferred playback settings and receive bonus content reflective of their viewing history while viewing Blu-ray disc 210 on any other network connected Blu-ray player.

Figure 3:
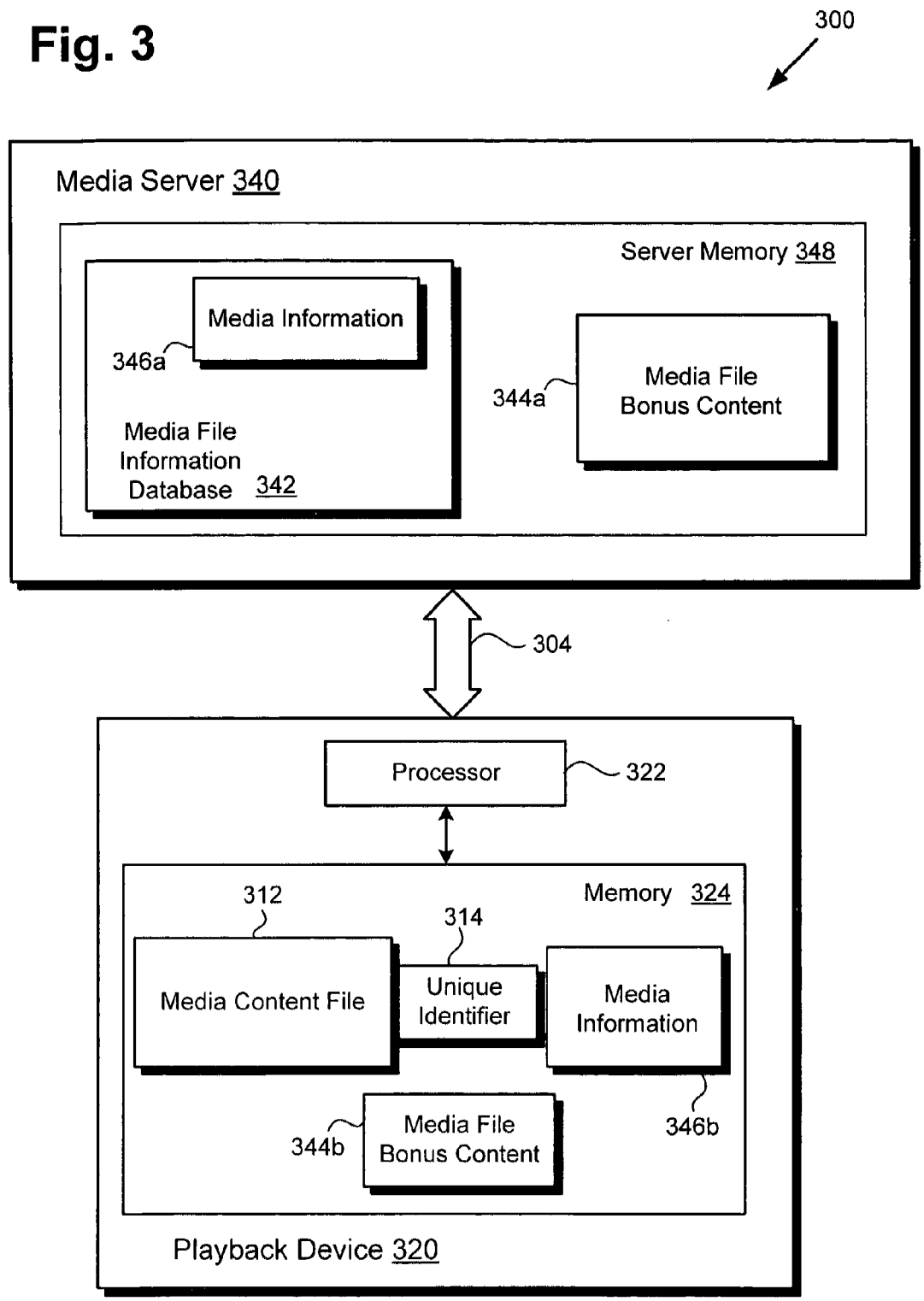
FIG. 3 shows a more detailed embodiment of a system for providing a personalized media consumption experience, according to one embodiment of the present invention.

FIG. 3 shows a more detailed embodiment of a system for providing a personalized media consumption experience, according to one embodiment of the present invention. System 300, in FIG. 3, includes playback device 320 in communication with media server 340 via network link 304. Media server 340 is shown to comprise server memory 348, on which are stored media file information database 342 including media information 346a, and media file bonus content 344a. Media server 340, media file information database 342, and media file bonus content 344a, in FIG. 3, correspond respectively to media server 140, media file information database 142, and media file bonus content 144, in FIG. 1. In addition, playback device 320, in FIG. 3, corresponds to playback device 120, in FIG. 1, and Blu-ray player 220, in FIG. 2. As shown in FIG. 3, playback device 320 comprises processor 322 and memory 324, corresponding respectively to Blu-ray player processor 222 and memory 224, in FIG. 2. Also shown in FIG. 3 are media content file 312 and unique identifier 314, corresponding respectively to media content file 212 and PMSN 214, in FIG. 2, media information 346b, and media file bonus content 344b.

According to the embodiment shown in FIG. 3, data corresponding to media content file 312 and unique identifier 314 are located in memory 324, having been uploaded from a content medium such as Blu-ray disc 210 in FIG. 2 (content medium not expressly shown in FIG. 3). In addition, media information 346b and media file bonus content 344b are also located in memory 324, corresponding to transfer of information from media server 340, over network link 304. FIG. 3 corresponds to the previously described situation in which a consumer of media content file 312 has previously performed a playback of media content file 312, either on playback device 320, or on another playback device in communication with media server 340 through a link corresponding to network link 304. It is noted that network link 304 is shown as a two-way communication, to represent ongoing communication between playback device 320 and media server 340.

Processor 322 may be the central processing unit for playback device 320, for example, in which role processor 322 runs the playback device operating system and facilitates association of media information 346b with media content file 312 through use of unique identifier 314. Processor 322 further manages retrieval of media content file 312 from memory 324, and its presentation to a consumer according to media information 346b.

Figure 4:
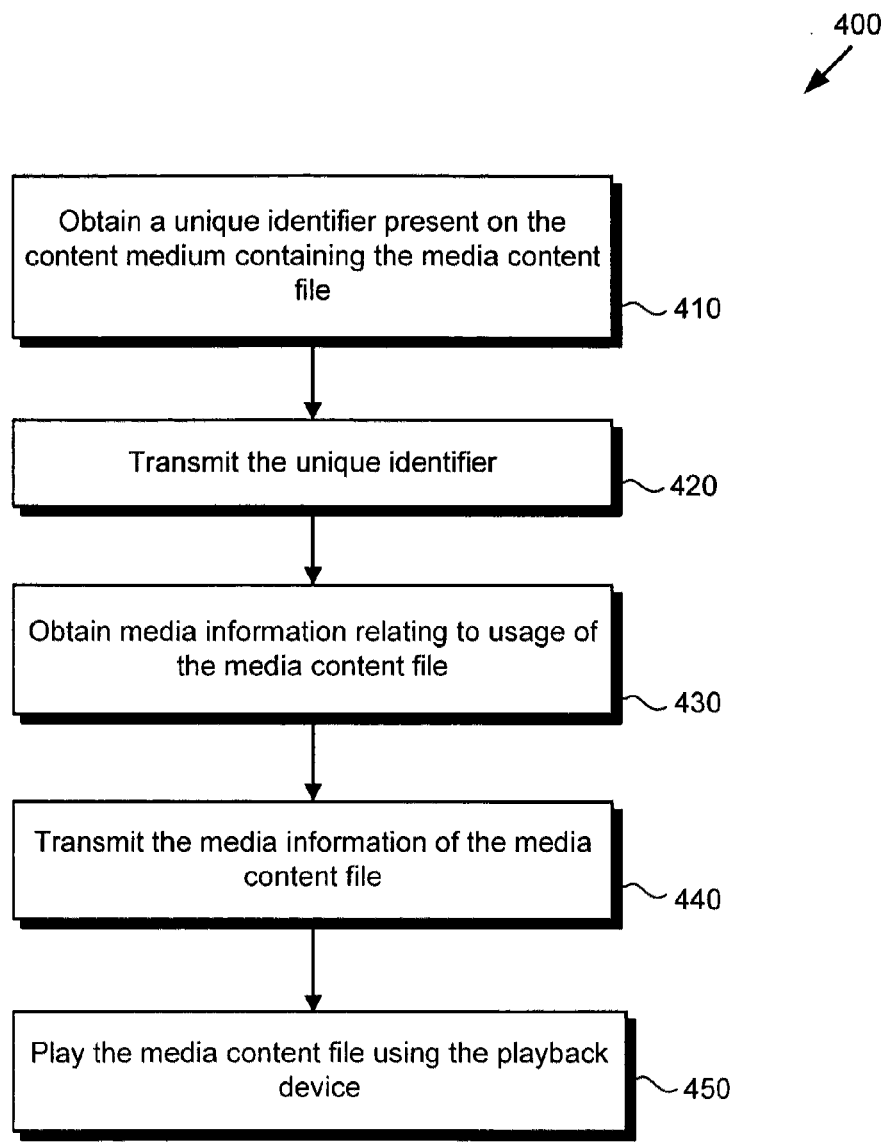
FIG. 4 is a flowchart presenting a method for use by a playback device to provide a personalized media consumption experience, according to one embodiment of the present invention.
Figure 5:
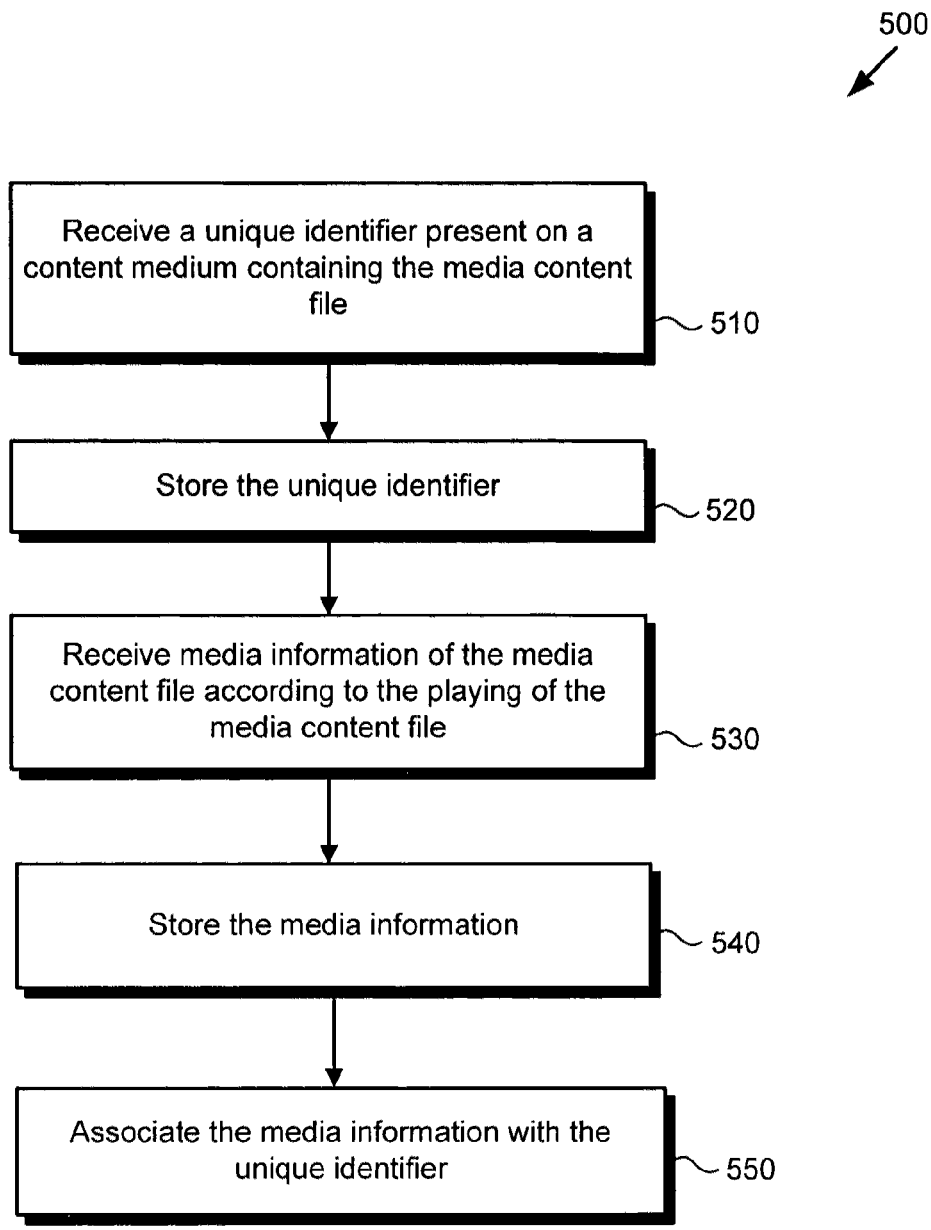
FIG. 5 is a flowchart presenting a method for use by a server to provide a personalized media consumption experience, according to one embodiment of the present invention.

The systems shown in FIG. 1, FIG. 2, and FIG. 3 will now be further described by additional reference to the flowcharts shown in FIGS. 4 and 5. Flowchart 400, in FIG. 4, shows an example of a method for use by a playback device to provide a personalized media consumption experience, while flowchart 500, in FIG. 5, presents a method for use by a server to provide a personalized media consumption experience, according to embodiments of the present invention. Although steps 410 through 450 indicated in flowchart 400, and steps 510 through 550 in flowchart 500, are sufficient to describe two respective embodiments of the present method, other embodiments may utilize steps different from those shown in flowcharts 400 and 500, or may include more, or fewer steps.

Beginning with FIG. 4, flowchart 400 presents an example method for use by a playback device for enabling association of media information relating to playback of a media content file with the content medium containing the media content file. Step 410 of flowchart 400 comprises obtaining a unique identifier present on the content medium containing the media content file. Referring to FIG. 2, step 410 may be performed by Blu-ray player 220, and may correspond to obtaining PMSN 214 stored on Blu-ray disc 210 which contains media content file 212. Although FIG. 2 represents the unique identifier as PMSN 214 of Blu-ray disc 210, that should not be construed as a limitation. In other embodiments, for example, a unique identifier may comprise another type of alpha-numerical code, a data file stored on the content medium, or data computed from elements present on the medium.

The method of flowchart 400 continues with step 420, which comprises transmitting the unique identifier. Step 420 may be performed by Blu-ray player 220 in FIG. 2 by, for example, transmitting data corresponding to PMSN 214 to memory 224. Alternatively, as shown by system 100 in FIG. 1, transmitting the unique identifier in step 420 may correspond to an operation in which playback device 120 transmits unique identifier 114 to media server 140 over network 104.

Moving on to step 430 of flowchart 400, step 430 comprises obtaining the media information relating to usage of the media content file. Referring once again to FIG. 2, step 430 may be performed by playback device 220, and may correspond to obtaining any of a wide variety of information concerning playback of media content file 212 on Blu-ray disc 210. For example, the media information obtained in step 430 may comprise a playback setting of the media content file 212, such as an audio language setting selected by a user of Blu-ray player 220, a subtitle display setting, or a screen format setting. Alternatively, or in addition to a playback setting of media content file 212, media information my include a stop position of playback of media content file 212 during the most recent viewing session, for example.

Moreover, as shown in FIG. 3, in some embodiments, media content file 312 may be accompanied by media file bonus content 344b, which may comprise movie or programming trailers, games, or advertising content, for example. In those embodiments, the media information obtained in step 430 may include information regarding which items of bonus content have been viewed, and may further include information regarding the frequency with which specific items of bonus content were viewed. For instance, step 430 may include obtaining information about which trailers have been watched and which remain unwatched. As another example, where the media file bonus content includes a game, the media information obtained in step 430 may include a play state of the game, such as a user's progression through the game, a game score accumulated by the user, the current score of the game, or responses to a game quiz, for example.

In some embodiments the media information obtained in step 430 may be used for creating a history of the playback experience of the media content file. Such a history may include information relating to whether a particular segment of the media content file has been viewed, for example. A history may also include information relating to the number of times particular segments of the media content file or items of media file bonus content have been viewed.

Step 440 of flowchart 400 comprises transmitting the media information of the media content file. Referring to system 300, in FIG. 3, step 440 may be performed by playback device 320, and may correspond to transmitting one or both of media information 346a and 346b for storage on respective media server 340, and/or in playback device memory 324. In one embodiment, transmitting the media information in step 440 may occur periodically during playback of media content file 312 on playback device 320. In addition, or as an alternative, transmitting the media information may occur upon stopping play of media content file 312 by playback device 320. It is noted that in some embodiments, transmitting media information 346a and/or 346b in step 440 may include transmitting unique identifier 314 as well, and may include associating media information 346a and/or 346b with unique identifier 314, such as the association of media information 346b and unique identifier 314 occurring in memory 324 of playback device 320, as shown in FIG. 3.

Continuing with step 450 of flowchart 400, step 450 comprises playing media content file 312 using playback device 320. For embodiments in which obtaining media information 346a or 346b in step 430 included obtaining a stop position of playback of media content file 312 during the last viewing session, for example, step 450 may correspond to resumption of playback at the stop position. Thus, in some embodiments, the method of flowchart 400 may further comprise obtaining previous media information 346b of media content file 312 associated with unique identifier 314, so that playing of media content file 312 in step 450 can be performed based on that previous media information stored in memory 324 of playback device 320. In that manner, for example, the playback preferences of a user of the content medium containing media content file 312 may be persistently associated with the content medium.

Alternatively, or in addition, media information 346a may be transmitted to media server 340 for association with unique identifier 314 and storage in server memory 348. In those latter embodiments, media information 346a may be obtained by playback device 320 from media server 340, prior to playing media content file 312 in step 450. In that manner, the playback preferences of a user of the content medium containing media content file 312 may be portably associated with the content medium. That is to say, playback settings entered using playback device 320 may be retrieved and used to modify the operating state of another playback device so as to automatically configure that other playback device according to the previously selected preferred playback settings associated with the content medium.

Turning to FIG. 5, flowchart 500 shows an example method for use by a server for associating media information relating to a media content file with the content medium containing the media content file, may unfold in an analogous manner. As shown by flowchart 500, such a method comprises receiving a unique identifier present on the content medium containing the media content file in step 510, storing the unique identifier in step 520, receiving media information of the media content file according to the playing of the media content file in step 530, storing the media information in step 540, and may further include associating the media information with the unique identifier in step 550.

As previously described, media information such as media information 346a on media server 340, shown in FIG. 3 for example, may include a history of the playback experience of media content file 312. As also previously explained, that history may include a stop position of an earlier playback of media content file 312, and/or information relating to whether and/or how often particular segments of media content file 312 have been viewed. Moreover, in some embodiments, the method of flowchart 500 can further comprise retrieving a previous media information, e.g. media information 346a, of media content file 312 associated with unique identifier 314 from server memory 348. That retrieval may occur, for example, in response to receiving unique identifier 314, and may be followed by transmittal of media information 346a to playback device 320, over network link 304. As discussed, in one embodiment, as shown by FIG. 2, media content file 212 may be a Blu-ray media content file, and the unique identifier may be PMSN 214 present on Blu-ray disc 210.

Thus, the present application discloses a solution that overcomes the drawbacks and deficiencies in the conventional art by enabling the consumer of a content media on a medium to persistently and portably associate personalized or preferred playback settings with the media content stored on the disc, and to have those personalized settings control playback across a plurality of networked playback devices. In addition, by mediating storage and retrieval of media information that may include information relating to playback history of the media content file and media file bonus content in an automated way, some embodiments of the present invention further enable provision of the consumer with fresh relevant bonus content responsive to their personal preferences, without requiring the consumer to proactively provide a network login or otherwise expressly specify or request delivery of the bonus content.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method for use by a playback device for enabling an association of media information relating to a playback history of a media content file with a medium containing the media content file, the method comprising:
   obtaining a unique identifier present on the medium;
   transmitting the unique identifier;
   obtaining the media information relating to the playback history of the media content file; and
   transmitting the media information relating to the playback history of the media content file; and
   modifying a playback setting of the playback device based on the media information, wherein the playback setting includes an audio language setting, a subtitle setting, a screen format setting.

2. The method of claim 1, wherein the method further comprises:
   playing the media content file using the playback device;
   wherein the obtaining of the media information includes obtaining the playback stop position of the media content file according to the playing of the media content file.

3. The method of claim 1, wherein the media information is used for creating the playback history of the media content file.

4. The method of claim 1, wherein the media information includes watched or unwatched trailers.

5. The method of claim 1, wherein the media information includes a play state of a game accompanying the media content file.

6. The method of claim 1, wherein the playback history includes information relating to one of whether a segment of the media content file has been viewed and a number of times a segment of the media content file has been viewed.

7. The method of claim 1, wherein the medium is a Blu-ray disc and the unique identifier is the Pre-Recorded Media Serial Number (PMSN) as defined in the AACS specification.

8. The method of claim 1, wherein prior to the playing the media content file, the method further comprises obtaining a previous media information of the media content file associated with the unique identifier, and wherein the playing the media content file is performed based on the previous media information.

9. The method of claim 1, wherein the playback device is in communication with a server, and wherein the transmitting the unique identifier and the transmitting the media information relating to the playback history of the media content file are to the server for enabling the server to associate the media information with the unique identifier.

10. The method of claim 9, wherein prior to the playing the media content file, the method further comprises obtaining a previous media information of the media content file associated with the unique identifier from the server, and wherein the playing the media content file is performed based on the previous media information.

11. The method of claim 1, wherein the playback device includes a memory, and wherein the transmitting the unique identifier and the transmitting the media information relating to the playback history of the media content file are to the memory for storage therein, and the method further comprising:
   associating the media information with the unique identifier.

12. The method of claim 11 further comprising:
   establishing a communication with a server;
   retrieving the unique identifier and the media information from the memory; and
   transmitting the unique identifier and the media information to the server for the associating of the media information with the unique identifier.

13. The method of claim 1, wherein transmitting the media information relating to the playback history of the media content file occurs periodically during playing the media content file.

14. The method of claim 1, wherein transmitting the media information relating to the playback history of the media content file occurs upon stopping the playing of the media content file.

15. The method of claim 1, wherein transmitting the media information relating to the playback history of the media content file includes a transmission of the unique identifier.

16. A method for use by a server for associating a media information relating to a playback history of a media content file with a medium containing the media content file, the method comprising:
- receiving a unique identifier present on the medium;
- storing the unique identifier in a memory;
- receiving the media information relating to a playback history of the media content file;
- storing the media information in the memory;
- associating the media information with the unique identifier; and
- transmitting the media information to a playback device for modifying a playback setting of the playback device based on the media information, wherein the playback setting includes an audio language setting, a subtitle setting, a screen format setting.

17. The method of claim 16, wherein the media information includes the playback history of the media content file.

18. The method of claim 16, wherein the playback history includes information relating to one of whether a segment of the media content file has been viewed and a number of times a segment of the media content file has been viewed.

19. The method of claim 16, wherein the media information includes a stop position of a playback of the media content file.

20. The method of claim 16, wherein the medium is a Blu-ray disc and the unique identifier is the Pre-Recorded Media Serial Number (PMSN) as defined in the AACS specification.

21. The method of claim 16 further comprising:
- retrieving a previous media information of the media content file associated with the unique identifier from the memory, in response to receiving the unique identifier; and
- transmitting the previous media information of the media content file to the playback device.

22. A method for use by a playback device for an enhanced use of a media content file within a medium, the method comprising:
- obtaining a unique identifier present on the medium;
- using the unique identifier to obtain a media information relating to a playback history of the media content file; and
- modifying an operating state of the playback device using the media information, wherein the playback setting includes an audio language setting, a subtitle setting, a screen format setting.

23. The method of claim 22, wherein the playback device is in communication with a server, and wherein using the unique identifier to obtain the media information includes:
- transmitting the unique identifier to the server; and
- receiving the media information relating to the playback history of the media content file from the server in response to transmitting the unique identifier.

24. The method of 22, wherein the operating state includes a playback stop position of the media content file, wherein the method further comprises playing the media content file based on the playback stop position of the media content file.

25. The method of claim 22, wherein the media information is used for creating the playback history of the media content file.

26. The method of claim 22, wherein the operating state includes watched or unwatched trailers.

27. The method of claim 22, wherein the operating state includes a play state of a game accompanying the media content file.

28. The method of claim 16, wherein the media information is used for creating the playback history of the media content file.

* * * * *